United States Patent
Pedrick et al.

(10) Patent No.: US 6,787,175 B2
(45) Date of Patent: Sep. 7, 2004

(54) PROCESS FOR PREPARING A STORAGE STABLE PREMIXED BATTER

(75) Inventors: Edward A. Pedrick, Egg Harbor Township, NJ (US); Loren Paul Wallis, Glendale, CA (US)

(73) Assignee: Good Karma Food Technologies, Inc., Burbank, CA (US)

( * ) Notice: Subject to any disclaimer, the term of this patent is extended or adjusted under 35 U.S.C. 154(b) by 68 days.

(21) Appl. No.: 10/264,856

(22) Filed: Oct. 4, 2002

(65) Prior Publication Data

US 2004/0067294 A1 Apr. 8, 2004

(51) Int. Cl.⁷ .............................................. A21D 10/00
(52) U.S. Cl. ........................ 426/549; 426/94; 426/128; 426/237; 426/521; 426/552
(58) Field of Search ............................... 426/549, 552, 426/94, 128, 239, 391, 521

(56) References Cited

U.S. PATENT DOCUMENTS

| | | | |
|---|---|---|---|
| 2,870,026 A | * | 1/1959 | Keller et al. ............... 426/549 |
| 3,620,763 A | * | 11/1971 | Hans ......................... 426/549 |
| 3,889,009 A | | 6/1975 | Lipoma |
| 3,970,763 A | * | 7/1976 | Moran et al. ............... 426/234 |
| 4,022,917 A | | 5/1977 | Selenke |
| 4,828,853 A | | 5/1989 | Banks et al. |
| 4,839,142 A | | 6/1989 | Charm |
| 4,853,238 A | | 8/1989 | Huang |
| 4,938,980 A | | 7/1990 | Arciszewski et al. |
| 4,975,246 A | | 12/1990 | Charm |
| 4,999,471 A | | 3/1991 | Guarneri et al. |
| 5,066,503 A | | 11/1991 | Ruozi |
| 5,389,335 A | | 2/1995 | Charm et al. |
| 5,539,673 A | | 7/1996 | Charm et al. |
| 5,814,363 A | | 9/1998 | Kuehner |
| 5,855,945 A | | 1/1999 | Laughlin et al. |
| 5,858,440 A | | 1/1999 | Laughlin et al. |
| 5,962,054 A | | 10/1999 | Kozempel et al. |
| 5,976,592 A | | 11/1999 | Polato |
| 5,998,774 A | | 12/1999 | Joines et al. |
| 6,039,994 A | | 3/2000 | LeFlecher et al. |
| 6,042,852 A | | 3/2000 | Atwell et al. |
| 6,228,403 B1 | * | 5/2001 | Narayanaswamy et al. . 426/128 |
| 6,344,229 B2 | | 2/2002 | Schubert et al. |
| 6,406,727 B1 | | 6/2002 | Hamid-Samimi et al. |

OTHER PUBLICATIONS

Modern Food Microbiology, 1978, p. 224.*

* cited by examiner

Primary Examiner—Lien Tran
(74) Attorney, Agent, or Firm—Greenberg Taurig, LLP

(57) ABSTRACT

A process for preparing a storage stable premixed batter, such as a batter for coating various foods, cakes, pancakes, waffles, etc. The batter, which may include flour, eggs, sugar, milk solids, leavening agent, etc., is premixed and rapidly processed at an high temperature such as between about 280° F. to 310° F. The mixture is then cooled to a predetermined temperature, then packaged for either refrigerated or ambient storage.

22 Claims, 1 Drawing Sheet

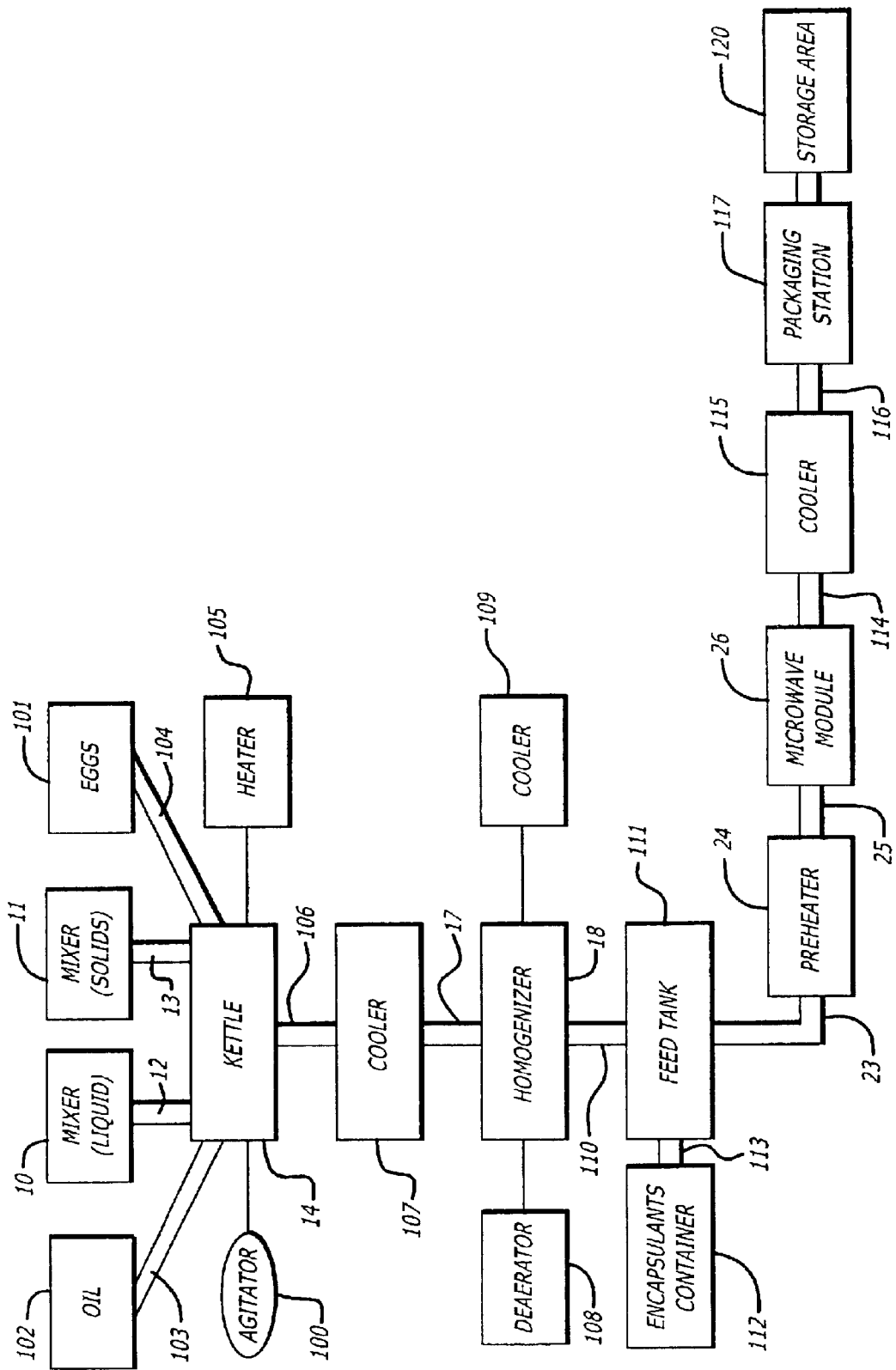

PROCESS FOR PREPARING A STORAGE STABLE PREMIXED BATTER

BACKGROUND OF THE INVENTION

1. Field of the Invention

The invention relates to premixed batters, and, more particularly, to a premixed batter having an extremely long shelf life with or without refrigeration.

2. Related Art

Premixed batters, such as those for making pancakes and waffles or the like, have been proposed in the past. A discussion of the problems involved in the packaging of such premixed products is disclosed in U.S. Pat. No. 4,022,917 to Selenke. In this 1977 patent, Mr. Selenke discusses that such a product, which is susceptible to spoilage through bacteria and mold growth, is generally intended to be used by the consumer within a few days after packaging. Freezing such a product has been attempted in the past but such a process requires constant refrigeration. Canning such products has been attempted but such a process involves heating the canned products to a high temperature which is not suitable for certain products, such a premixed pancake or waffle batter. At the canning stage, a premixed pancake or waffle batter cannot tolerate such high temperatures.

Chemical additives may be used to inhibit the growth of mold and bacteria. However, certain premixed batters, such as batters for pancakes and waffles, require a leavening agent which generally cannot exist at the lower pH level recommended by Mr. Selenke in which such additives work.

In U.S. Pat. No. 4,022,917, Mr. Selenke concludes that, before his patent, a premixed batter was not known that could be manufactured dry and be stable at room or refrigeration temperatures for an indefinite period of time until used by the consumer.

However, applicant is not aware of any such premixed batter that has been commercially successful. Such batters do not survive a processing temperature above 150° as mentioned by Mr. Selenke in discussing the canning process in his patent. Such prior art products, it is believed by applicant, were not commercially successful since they did not have a sufficiently long shelf life to succeed in the marketplace.

There is a need for a storage, stable, premixed batter that has a relatively long shelf life and good taste.

OBJECT OF THE INVENTION

It is an object of this invention to provide a premixed batter which is stable in storage, resistant to bacteria and mold growth, and usable at any time after storage to form a batter, such as a pancake or waffle batter.

It is a further object of this invention to carry out the foregoing object wherein the batter has good taste and a relatively long shelf life with or without refrigeration.

These and other objects are preferably accomplished by providing a storage stable premixed batter, such as a batter for coating various foods, pancakes, cakes, waffles, etc., which may include flour, eggs, sugar, milk solids, etc. The batter is premixed and rapidly processed at an ultra high temperature, such as between about 275° F. to 310° F. in a short time.

The mixture is then cooled rapidly and packaged in individual packages that may be either refrigerated or stored at ambient temperatures.

BRIEF DESCRIPTION OF THE DRAWING

The drawing is a block diagram of the preferred process of forming a storage stable premixed batter.

DESCRIPTION OF THE PREFERRED EMBODIMENT

The process involved in forming a batter in accordance with the teachings of the invention is shown in the flow diagram in the drawing.

The first step in the process, as indicated in mixer 10, which may be a double wall scraped surface kettle, is to mix a liquid, such as water or milk, at ambient temperature, e.g., about 80° F. for about 5 to 30 minutes, with any eggs, if desired. The eggs may be obtained from egg source 101, and mixed with the liquid in kettle 14 via line 104. Kettle 14 may also be a double wall scraped surface kettle. At the same time, a mixture of dry solids, such as starches, wheat, rice, corn, or other flours, is mixed, under agitation, for about 5 to 30 minutes, as indicated in mixer 11 and fed via line 13 to kettle 14. Kettle 14 has a blender or agitator 100 associated therewith for agitating the contents of kettle 14.

Preferably only 70% of the liquid, which may be milk or water or any combination thereof, is initially fed into the kettle 14 during the initial agitation process. After blending the ingredients in kettle 14, the remaining 30% of the liquid may be fed into kettle 14 from mixer 10 or other suitable source at a temperature of about 140° F. to 150° F. for about 5 to 30 minutes.

Heater 105, coupled to kettle 14, may be used to increase the temperature of the contents thereof to about 190° F. and hold the contents at that temperature for about 5 minutes.

At this time, oil may be introduced from oil source 102 via line 103 (and/or emulsifiers, if desired) into kettle 14 while agitating the same. The oil may be preheated to a temperature of about 120° F. Also, any suitable flavoring may also be introduced at this time.

Suitable starches may include tapioca, corn, potatoes, etc.

The blended ingredients in kettle 14 may now be fed via line 106 (by gravity feed, manually or by pumping, for example) to a cooler 107, where the ingredients are cooled to a temperature between about 145° F. to 170° F., preferably about 150° F. From cooler 107, the cooled ingredients are fed via line 17, again by gravity feed, pumping, etc. to a variable homogenizer 18 and homogenized therein at about 170° F. in a 2 stage process, e.g., at 2500 psi for the first stage and about 500 psi for the second stage.

The mixture in homogenizer 18 may be deaerated by deaerator 108, coupled to homogenizer 18, to remove bubbles from the mixture. Alternatively, the mixture may merely be allowed to rest until bubbles are removed. The deaerated mixture may now be cooled to a temperature of about 120° F. by cooler 109 (or the mixture may be passed through cooler 109 which may have cooling tubes therein).

The cooled mixture may now be fed via line 110, by gravity feed or by pumping, to feed tank 111. Feed tank 111 is agitated for a time sufficient for uniform dispersion of the mixed ingredients.

At this stage, encapsulants, from container 112 are introduced into tank 111 via line 113. Such encapsulants are leavening agents, such as baking powder, baking soda, etc. or a mixture thereof, encapsulated in pellets having dissolvable outer shell.

The mixture is now fed via line 23 to a preheater 24 where the mixture is preheated to about 140° F. The mixture is then fed via line 25 to a focussed microwave module 26. In module 26 the mixture is rapidly heated to a temperature of about 300° F. For example, module 26 may rapidly heat the mixture from its introduction temperature of about 140° F. to about 300° F. in about 1½ seconds. This flash heater sterilizes the mixture which is then fed via line 114 to cooler 115 where it is rapidly cooled to a temperature of about 80° F. to 90° F.

This rapid heating and rapid cooling creates a sterilized product having a long shelf life.

The encapsulated leavening agent survives the rapid heating and rapid cooling with its dissolvable shells intact but sterilized.

The resulting batter exists from cooler 115 at a temperature of about 75° F. to 80° F. and is conveyed via line 116 to packaging station 117. The batter is storable with a long shelf life and with the leavening agent dispersed throughout the batter.

In summary, as discussed, the first step in the process takes place in kettle 14 wherein a predetermined mixture of water, eggs in liquid form, oil and/or fluid milk solids is mixed. Any suitable oil or oil substitute, such as fats, margarine or butter may be used. Any suitable proportions of ingredients may be used such as 0–10% water by weight, 1–7% eggs by weight, 4 to 10% oil by weight, and 40 to 60% milk solids by weight. Obviously, liquid milk may be used, thus eliminating the need for water. If milk solids are used, some water is necessary.

The dry solids in mixer 11 may be comprised of flour, such as all-purpose flour, and are mixed together. In the step of adding encapsulants, as indicated above in container 112, a suitable portion may be about 20 parts flour and 1 part leavening agent.

Any suitable means, such as manual feed, gravity feed, centrifugal pumps, conventional speed controlled processors, vortex blenders, etc. may be used.

Any suitable electronic means, such as applying an electric current or using current microwave technology may be used.

The microwave module 26 applies electromagnetic waves through the mixture flash heating it to an ultra high temperature (UHT) in a fraction of an instant to destroy all bacteria while remaining the fresh taste of the milk in the mixture and increasing the shelf life of the final product without destroying the encapsulants. The UHT may be between about 280° F. to 310° F., and preferably about 290° F.

An electric current may also be passed through the mixture as a result of applying voltage across electrodes that have been placed in contact with the mixture. With more conventional heating methods, the temperature of the wall or tube where the product is heated must be significantly higher than the temperature of the product in order to reach the required temperature to pasteurize or sterilize the product. This increases the risk of fouling and scorching of the product near the walls and leads to the formation of off-flavors. Because microwave heating uses electromagnetic waves through the food product, the electrical power is translated into heat as it passed along the flow line of the fluid. This allows rapid, uniform heating to occur without the risk of overheating or burning the product.

The specific temperature used is predetermined to match the desired shelf life of the final product.

Cooler 115 may be an ammonia chilled plate, where the treated mixture is rapidly cooled down to a desired temperature, such as between 80° to 90° F. The more quickly the product is cooled down, the better.

Packager 117 may be any suitable packaging line and predetermined amounts of the mixture are deposited in individual containers, such as conventional gable-top milk cartons, or aseptic tetra brick storage packages. The latter are multi-layer composite oxygen barrier containers that can be stored at room temperature.

The packaged product may then be conveyed to a storage area 120. At the storage area, the packaged material may be palletized and stored in either refrigerated storage at 38° F. (if gable-top containers are used) or dry storage, at ambient or room temperature (if in brick form).

It can be appreciated that, as previously discussed, any suitable edible starches can be used, such as tapioca, potato, etc., and any suitable flours, such as wheat, whole, white or buckwheat, and grains such as rice, corn, etc. may be used. The encapsulated leavening agent may include a capsule outer coating with an internal leavening agent, which may be a liquid, and which is not destroyed in the rapid heating process. That is, the capsule surface is sterilized and the final product comes out of the cooler 115 at about 75° F. to 80° F. and is storable with a long shelf life with the leavening agent dispensed throughout the product. When the batter is heated in a pan or the like by the user, the leavening agent breaks down under the high cooking heat of about 350° F. wherein a chemical reaction takes place and the leavening agent disperses throughout the batter to leaven the same.

Any suitable leavening agent may be used, such as baking powder or baking soda, in a hardened palm kernel oil may be used. One such agent may be a combination, e.g., 75% to 25% of sodium bicarbonate and magnesium bicarbonate. The capsule coating may include a dissolvable outer coating of an approved food grade product, e.g., a combination of cellulose or a high melt fat or hydrocolloid or a combination thereof.

Any suitable leavening agent that creates carbon dioxide during the cooking process may be used. One example would be carbon dioxide pellets. Also, the inclusion of ingredients such as those containing albumin create "air bubbles" that are entrapped within the batter. This aids in the ability of batters to rise. Additionally, a saponin, extracted from the yucca plant, which has been found to contain an air entrapping ingredient or agent and is heat resistant to a temperature in excess of 300° F., can be used. It can be used in liquid or powder form.

Although microwave heating has been disclosed, any suitable electromagnetic radiation, such as RF or pulse light or gamma ray may be used. Any suitable heating equipment may be used, such as electric heating or ohmic heating. One such focussed microwave apparatus that can be used to "rapidly heat the mixture" is disclosed in U.S. Pat. No. 5,998,774.

It can be seen that there is discussed a process for forming a premixed batter, such as a batter for pancakes and waffles or the like, that has an extremely long shelf life with good taste when used. The batter can either be formed by a process wherein the final product can be stored at refrigerated or room temperature.

Although particular proportions in the mixture of components have been disclosed, the final product will include oil or its equivalent, milk in liquid or solid form, flour and a leavening agent, such as baking powder and/or baking soda, or a mixture thereof. Any suitable type of flour or mixtures thereof may be used. Optionally, water (particularly if milk solids are used), and eggs or egg substitutes may be added to the mixture. A small amount of sugar or flavoring spices may be added.

Although a particular embodiment of the invention has been disclosed, variations thereof may occur to an artisan and the scope of the invention should only be limited by the scope of the appended claims.

We claim:

1. A method for preparing a storage stable batter comprising the steps of:

forming a mixture of oil and a liquid other than oil in a blender, and blending the same;

adding a predetermined quantity of flour to a blender and blending the same with said blended mixture of oil and a liquid;

subsequently agitating the blended mixture;

subsequently removing air bubbles from said agitated blended mixture;

subsequently adding an encapsulated leavening agent to said agitated mixture;

subsequently applying electronic means through said agitated blended mixture at an ultra high temperature in a short term thereby sterilizing the same;

subsequently cooling said sterilized mixture to a predetermined temperature without affecting the organoleptic properties of the mixture; and subsequently packaging said cooled sterilized mixture.

2. The method of claim 1 including the step of adding eggs to the oil and liquid when blending the same.

3. The method of claim 1 wherein the step of forming a mixture of oil and a liquid other than oil includes the step of forming a mixture of oil and a liquid comprised of milk.

4. The method of claim 3 wherein the step of forming a liquid comprised of milk includes the step of forming a mixture of milk solids and water.

5. The method of claim 3 wherein the step of forming a liquid comprised of milk includes the step of forming a liquid of soy milk.

6. The method of claim 1 wherein the step of adding a predetermined quantity of flour includes the step of adding a predetermined quantity of white flour.

7. The method of claim 1 wherein the step of forming a mixture of oil and a liquid other than oil comprises the step of forming a mixture of oil and water.

8. The method of claim 1 wherein the step of removing air bubbles includes the step of allowing the mixture to rest until air bubbles are eliminated from the mixture.

9. The method of claim 1 wherein the step of removing air bubbles includes the step of deaerating the mixture to remove air bubbles therefrom.

10. The method of claim 1 wherein the step of applying electronic means includes applying an electric current at a temperature of between about 280° F. to 310° F.

11. The method of claim 10 wherein the step of applying an electric current includes the step of applying said electric current at about 300° F.

12. The method of claim 1 wherein the step of applying electronic means includes the step of applying an electric current in a short term includes the step of applying said electric current for between about 1½ to 10 seconds.

13. The method of claim 12 wherein the step of applying said electric current in a short term includes the step of applying said electric current for about 3 seconds.

14. The method of claim 1 wherein the step of applying electronic means includes the step of applying focused microwaves.

15. The method of claim 1 wherein the step of cooling said mixture includes the step of cooling said mixture to a temperature of about 80° to 90° F.

16. The method of claim 1 wherein the step of packaging said mixture includes the step of packaging predetermined amounts of said mixture in individual gable-topped cartons.

17. The method of claim 1 wherein the step of packaging said mixture includes the step of the packaging predetermined amounts of said mixture in bricks storable at room temperature.

18. The method of claim 1 wherein the step of forming a mixture of oil and a liquid other than oil includes the step of forming a mixture of about 4% to 10% by weight of oil and about 40% to 60% by weight of milk and the steps of forming a mixture of flour and subsequently adding a leavening agent includes the step of forming a mixture of about 20 parts of flour to one part of leavening agent.

19. The method of claim 1 wherein the step of adding an encapsulated leavening agent includes the step of adding a pellet having a solid outer coating containing an ingredient that creates carbon dioxide when subject to high heat at a temperature of about 350° F.

20. The method of claim 19 wherein the step of adding a pellet containing an ingredient includes the step of adding an ingredient which entraps air until heated to a temperature of about 350° F. thereby releasing said trapped air and dispersing the same throughout said batter.

21. The method of claim 1 wherein the step of adding an encapsulated leavening agent includes the step of adding a saponin.

22. A method for preparing a storage stable batter comprising the steps of:

forming a mixture of oil and a liquid other than oil in a blender, and blending the same;

adding a predetermined quantity of flour in a blender and blending the same with said blended mixture of oil and a liquid;

subsequently agitating the blended mixture;

subsequently removing air bubbles from said agitated blended mixture;

subsequently adding an encapsulate leavening agent to said agitated mixture;

subsequently applying heating means through said agitated blended mixture at high temperature in a short term thereby sterilizing the same;

subsequently cooling said sterilized mixture to a predetermined temperature without affecting the organoleptic properties of the mixture; and subsequently packaging said cooled sterilized mixture.

* * * * *